US006438326B1

(12) United States Patent
Niederecker et al.

(10) Patent No.: US 6,438,326 B1
(45) Date of Patent: Aug. 20, 2002

(54) APPARATUS FOR THE EXPOSURE OF ADDITIONAL INFORMATION INTO THE FILM PLANE OF A CAMERA

(75) Inventors: Günter Niederecker, Oberkochen; Bernd Spruck, Mögglingen, both of (DE)

(73) Assignee: Carl Zeiss Stiftung, Heidenheim (DE)

( * ) Notice: Subject to any disclaimer, the term of this patent is extended or adjusted under 35 U.S.C. 154(b) by 0 days.

(21) Appl. No.: 08/492,180

(22) Filed: Jun. 19, 1995

(30) Foreign Application Priority Data

Jun. 28, 1994 (DE) .......................... 94 10 405 U

(51) Int. Cl.[7] .............................................. G03B 17/24
(52) U.S. Cl. ...................... 396/315; 396/316; 396/318; 396/432
(58) Field of Search ................................ 354/106, 105, 354/79

(56) References Cited

U.S. PATENT DOCUMENTS 4,021,825 A * 5/1977 McCann et al. ............... 354/79
4,057,318 A * 11/1977 Schindl ........................ 350/19
4,449,805 A * 5/1984 Sakurada et al. ............ 354/105
4,567,478 A 1/1986 Schwab ....................... 340/708
5,278,604 A * 1/1994 Nakamura ................... 354/412
5,331,368 A * 7/1994 Oosawa et al. .............. 354/483
5,389,991 A * 2/1995 Naka et al. .................. 354/159

FOREIGN PATENT DOCUMENTS

DE         2710735         9/1978

* cited by examiner

*Primary Examiner*—Daniel P. Malley

(57) ABSTRACT

An apparatus for the exposure of additional information into the film plane of a camera, is located in a data back. The data back has a two-column liquid crystal display. Control of the data back takes place directly through the printer output of a computer. The data to be exposed can be entered for this purpose by means of the computer keyboard. The computer is simultaneously connected via the printer output to the code transducer and to the path measuring system of the zoom system of the photomicroscope. The overall magnification is calculated from the data which is read in, by means of a computer program, and is exposed in the photograph by means of the data back.

22 Claims, 4 Drawing Sheets

APPARATUS FOR THE EXPOSURE OF ADDITIONAL INFORMATION INTO THE FILM PLANE OF A CAMERA

BACKGROUND OF THE INVENTION

1. Field of the Invention

The present invention relates to an apparatus, which is controlled by an electronic control device, for the exposure of additional information into the film plane of a camera.

2. Relevant Prior Art

Such apparatus is known, for example, from U.S. Pat. No. 4,567,478 in photomicroscopes and from the automatic cameras "WILD MPS48/52" of the Leica Company. In the photomicroscope according to U.S. Pat. No. 4,567,478, the LCD display for generating the additional information which is to be exposed is arranged within the photo tube of the microscope in front of the cameras. The liquid crystal display is reflected by prisms into the photo ray path. In contrast to this, the automatic camera "WILD MPS48/52" has a data back. The exposure of the additional information takes place by means of a display which is illuminated from behind and which is arranged behind the film plane of the camera. Cameras with such data backs are also known, for example, from German Patent DE-A1-2,710,735.

The two first named photomicroscopes have in common that the electronic control device is respectively arranged in an operating panel which is specially constructed for the intended application. If data exposure is to be retrofitted to existing photomicroscopes, it is also necessary, according to U.S. Pat. No. 4,567,478, to retrofit the photo attachment including the electronic control device. And also in the automatic camera "WILD MPS48/52", a retrofitting of the control panel is additionally required for the interchange of the camera.

In the camera of the above mentioned DE-A12,710,735, the whole electronics required for the exposure of the additional information is integrated into the data back itself. The input of the additional information takes place through an input keyboard, which is likewise provided on the data back. A solution of this kind is considered to be very disadvantageous, however, in the case of photomicroscopes, since it is often the case that the data back is not easily accessible to the user of the microscope.

SUMMARY OF THE INVENTION

The present invention has as its object an apparatus for the exposure of additional information into a camera, in which the additional information can be easily and conveniently entered, even when used on a photomicroscope. In addition to this, it should also be possible to retrofit existing microscopes which lack corresponding data exposure, at as low as possible a cost.

According to the invention, these objects are achieved by an exposure apparatus being controlled by an electronic control device, wherein the electronic control device is a commercially available computer, for example, a personal computer or a laptop, which has at least one serial or parallel standard interface. The exposure apparatus is directly controlled via the standard interface of the computer, that is to say, without the interposition of a special control panel or a further electronic control device. According to the invention, the input means, for example the keyboard, of the computer itself is used for entering the additional information. The additional information which is entered, and the actual camera setting, for example, the exposure time, can be indicated on the computer monitor. Since the computer keyboard and the monitor can be positioned independently of the microscope, convenient input and checking of the additional information are possible.

Since nowadays. many microscopes are already equipped with a commercial computer for microscope control, or since a computer is in any case available to many microscope users, all that is necessary for the retrofitting of existing microscopes is the retrofitting of the apparatus for the exposure of additional information and the loading of the corresponding control program into the computer. A very inexpensive retrofitting is thus possible in most cases. And even if no commercial computer is available to the user and has to be purchased, the computer can still be used for other purposes, which is not the case when a special control panel provides the electronic control apparatus for the camera.

It has been found to be advantageous for programming the program when the parallel printer interface of the computer is used for the control of the data exposure. The conversion which is then required of the parallel interface into the serial $I^2C$ interface for the driver of the display used for data exposure can then take place by means of a simple circuit with two transistors.

A particularly simple retrofitting of the apparatus according to the invention is possible when the exposure apparatus is arranged in the data back of a camera. In this case, the camera itself can remain unaltered, and it is only necessary to retrofit the data back. A liquid crystal display can be arranged in the data back in a known manner for the generation of the additional information. To assure that the exposure of the additional information can take place in the short time between the closing of the camera shutter and the film transport, a very bright light-emitting diode should be provided for illuminating the liquid crystal display.

In a further advantageous embodiment of such a data back, two plane mirrors are arranged one behind the other between the light emitting diode and the liquid crystal display, without the interposition of refracting optics, the surface normal of the second mirror being directed at an inclination to the plane spanned by the surface normal of the first mirror and the light emitting diode. It has then surprisingly been found that even LCD displays with dimensions of about 5 mm×20 mm are illuminated sufficiently evenly by a single light emitting diode, when the light from the light emitting diode is passed via two mirrors arranged in a mutually crossed position. Such an LCD display can have, for example, two columns each with eight fields of a 5×7 dot matrix, so that a total of 16 alphanumeric characters can be represented. In such a two-column liquid crystal display, an insertable screen can be provided between the film and the display. One LCD column can be covered by this screen, so that the user can choose between exposure of additional data within a single column and within two columns.

The device according to the invention can in particular be advantageously used in connection with photomicroscopes. The photomicroscope can itself have additional means for outputting information concerning the microscope setting. It is then advantageous if this means for outputting information is likewise controlled by the computer via the same standard interface as the exposure apparatus. Thus only a single interface of the computer is taken up for both purposes.

The means for outputting information can in particular be the code transducer of the revolving nosepiece and/or the path measurement system of the zoom system of the microscope. In this case, the imaging scale of the microscope image on the camera can be automatically determined by the computer and can be exposed into the picture via the LCD display.

In photomicroscopes with several photo outlets, the cameras can futhermore have a coding in the region where they are attached to the photomicrosope and the photo outlet of the photomicrosope can have an associated counter-coding or a corresponding code reader. If this signal is also read out by the computer, it can be automatically checked by the computer program to determine whether data exposure is all possible in the camera in use, and in the negative case a warning signal can be emitted to the user.

BRIEF DESCRIPTION OF THE DRAWINGS

Details of the invention are further explained herein below with reference to the preferred embodiments of the invention, taken together with the accompanying drawings, in which.

DETAILED DESCRIPTION OF PREFERRED EMBODIMENTS

Figure 1:
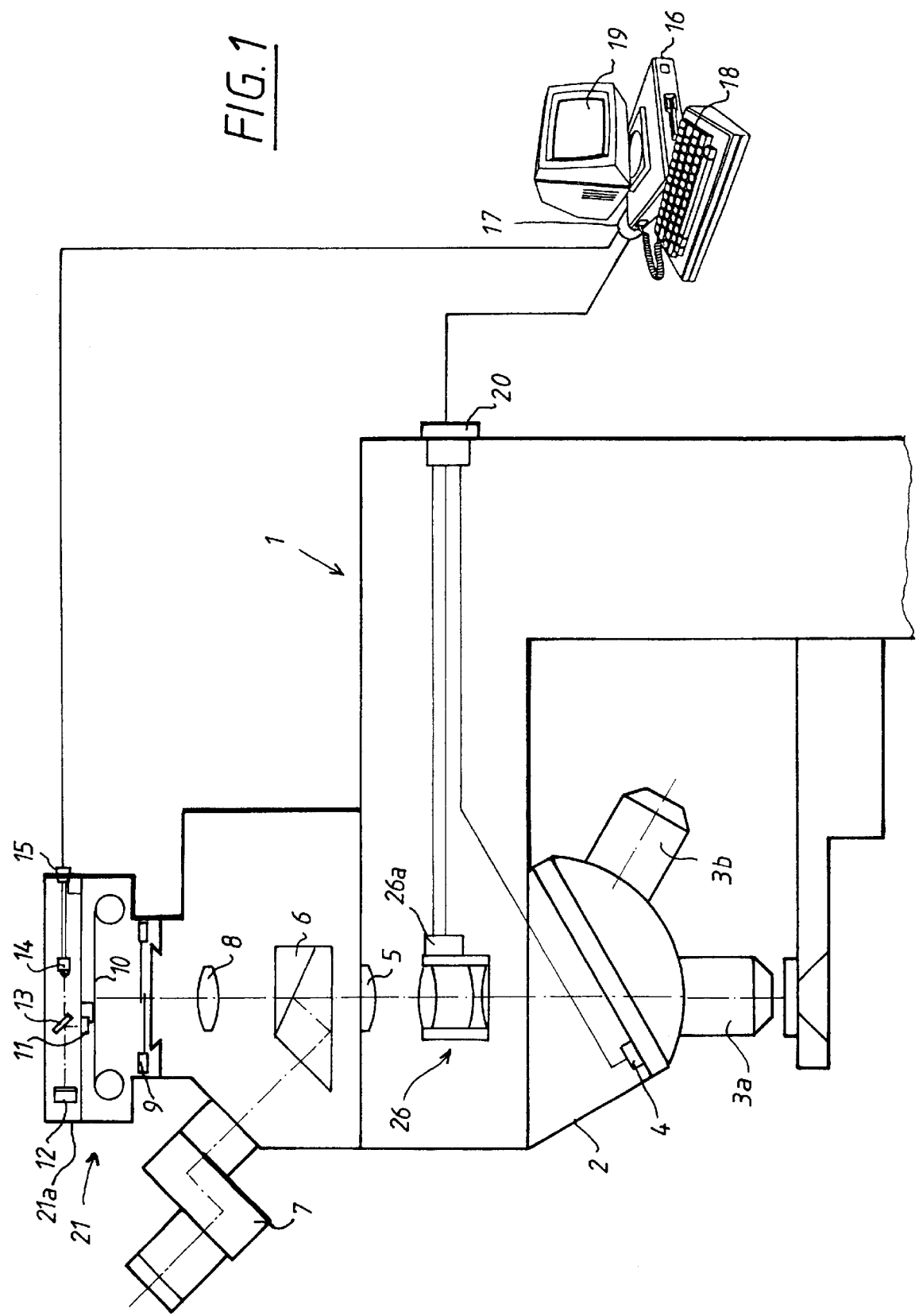
FIG. 1 is a section of a photomicroscope, in a plane containing the optical axis, with a device according to the invention.

The upper part of the photomicroscope is denoted by (1) in FIG. 1. It has a revolving nosepiece (2), into which several objectives (3a, 3b) are screwed. The changeover positions of the revolving nosepiece are coded by a code transducer (4). A zoom system (26), which is shown schematically, is located between the revolving nosepiece (2) and the tube lens (5), and its magnification factor which is set at any time can be determined by means of a path measurement system (26a).

Items which are not shown in FIG. 1 are the transmission illumination source arranged beneath the microscope stage, and a source of illumination which is reflected into the ray path between the revolving nosepiece (2) and the tube lens (5). The transmission illumination source and the reflection light illumination source are of conventional construction, and their detailed representation can thus be omitted in order to simplify the drawing.

The division into the ocular ray path and the photo ray path takes place above the tube lens (5). A portion of the light coming from the objective (3a) is deflected by the prism (6) into the ocular tube (7), and another portion of the light is deflected along the photo ray path to the camera (21). The photo-objective (8) in the photo ray path produces an image of the object in the plane of the film (10) of the camera (21). The motor-driven camera shutter (9) is located between the photo-objective (8) and the film (10).

The data back (21a) is located behind the film (10), in the direction of the light coming from the objective (3a). The data back (21a) contains a two-column liquid crystal display (11) which is arranged near the film plane and which makes possible the exposure of alphanumeric additional information on the image edge of the short side of the photographic format. The liquid crystal display is uniformly illuminated from behind by means of a very bright light-emitting diode (14) and by means of three plane deflecting mirrors (12a, 12b). The data back (21a) furthermore contains an electronic card which contains, among other things, the commercial driver for the liquid crystal display (11).

Figure 2A:
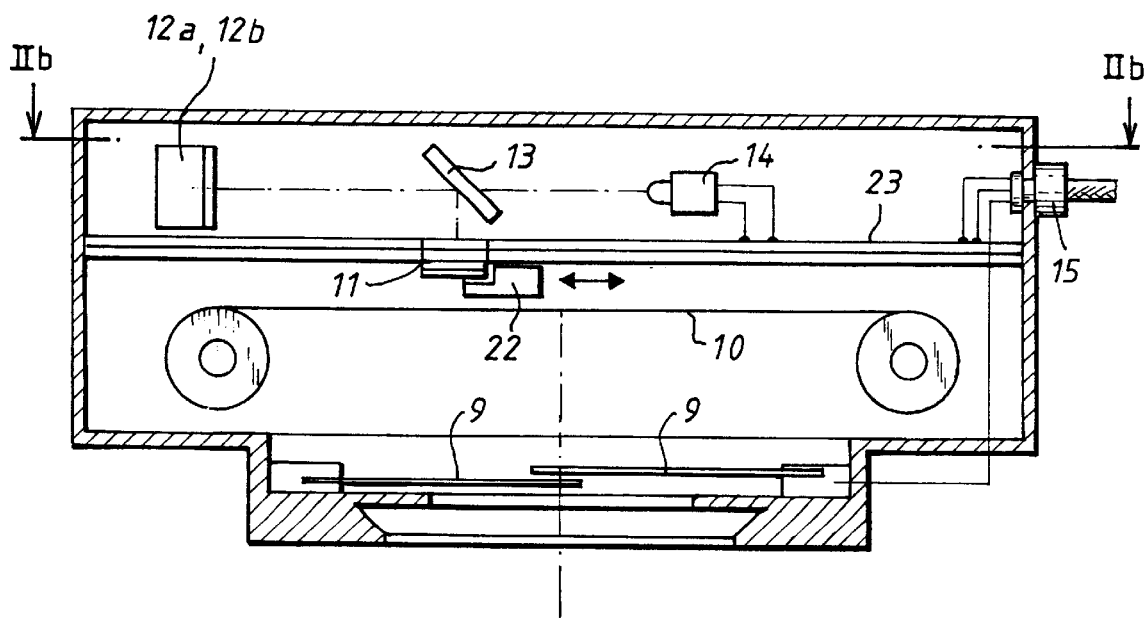
FIG. 2a is an enlarged section through the camera of the embodiment according to FIG. 1.
Figure 2B:
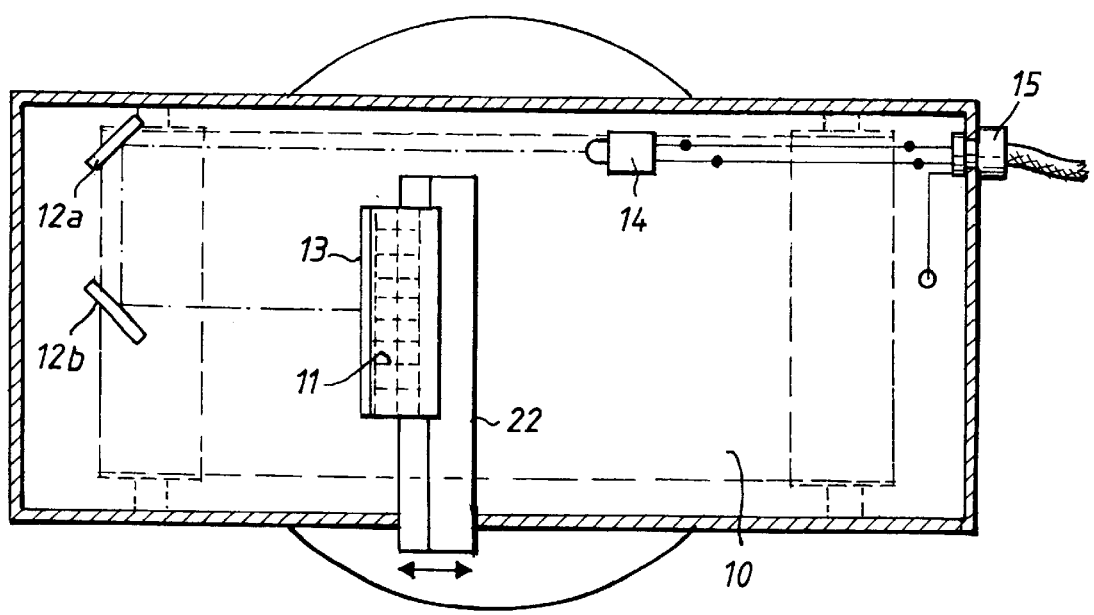
FIG. 2b is a section through the camera of FIG. 2a, along the line IIb—IIb.

The detailed construction of the camera (21) and of the data back (21a) can be gathered from the sectional illustrations of FIGS. 2a and 2b. The divergent light beam emerging from the light emitting diode (14) is first deflected by means of two plane mirrors (12a, 12b) which are arranged mutually at right angles. The middle axis of the light beam is thereby guided substantially in a plane behind the film (10) and parallel to the film plane. The light beam is then deflected, by a further mirror (13) whose surface normal is at an angle of 45° to the plane of the surface normals of the mirrors (12a) and (12b), in the direction towards the film (10) and the liquid crystal display (11). The liquid crystal display (11) has two columns, each with eight fields, each field consisting of a 5×7 dot matrix. By means of a slide (22) arranged between the liquid crystal display (11) and the film (10), one column of the liquid crystal display can be covered, so that the user can choose between illumination by one column with eight characters and two columns with a total of 16 characters. The liquid crystal display (11) is arranged in an opening of the electronic card (23).

Figure 4:
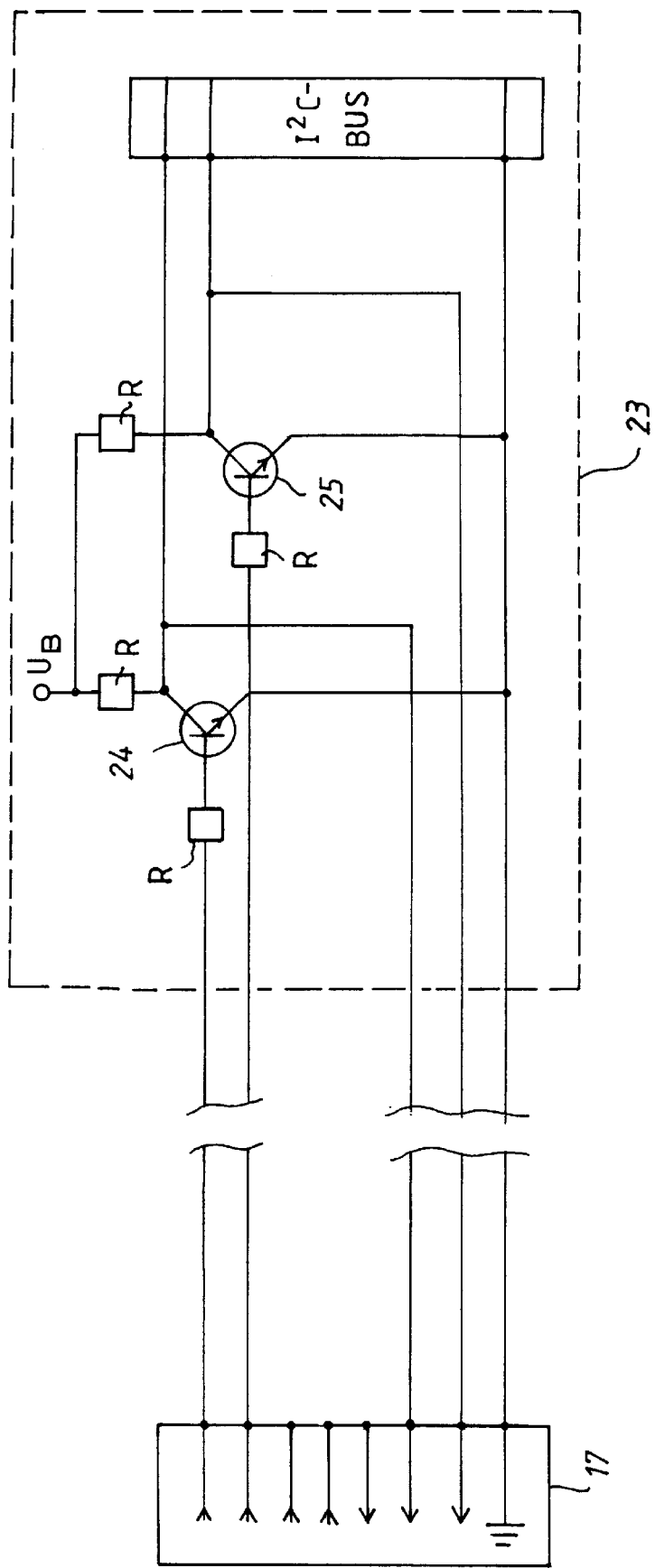
FIG. 4 is a schematic circuit diagram for the conversion of a parallel interface of the computer into the I²C interface of the LCD driver for the data exposure.

The entire control of the camera (21) and of the data back takes place by means of a conventional computer (16), which can be, for example, a personal computer or a laptop. The control takes place directly via the printer port (17), which is designed as a parallel interface, of the computer (16). For this purpose, the printer port (17) is then connected directly, without interposition of further electronics, via a data cable to the interface (15) of the data back. The conversion of the parallel interface (17) into the serial I²C bus interface of the driver for the liquid crystal display (11) takes place on the electronic card (23) in the data back by means of the simple circuit shown in FIG. 4 and essentially consisting of two transistors (24, 25) and resistors R. only two data outputs and two data inputs, and the ground lead of the parallel interface (17), are required for data transport. The two data outputs are connected via a respective resistor R to the base of one of the two transistors (24, 25). The collectors of both transistors (24, 25) are, via resistors R, at the supply voltage $U_B$ of 5 volts. The emitters of both transistors (24, 25) are grounded. The collector leads of each of the transistors (24, 25) directly form the two data leads of the I²C bus system. Each of the collector leads is at the same time connected to a data input of the parallel interface.

As can furthermore be gathered from FIG. 1, the data outlet (20) of the microscope stand, to which outlet the information is connected by means of the code transducer (4) of the revolving nosepiece and the path measuring system (26a) of the zoom system (26), is likewise controlled through the printer output (17) of the computer (16). The additional information is entered by means of the keyboard (18) and is simultaneously displayed on the monitor (19). The information concerning the present microscope settings, for example, the magnification and the required exposure time of the shutter (9), are likewise displayed on the monitor (19).

For the data conversion from the parallel interface to the I²C bus interface, the associated computer program must be able, for example by corresponding program modules, to generate typical start and stop conditions for the I²C bus. Furthermore, typical routines for sending and receiving an I²C bus byte must be present, and of course the nominal voltage of the I²C bus must be present. The information required for these routines can be found in, for example, "Datenbuch I²C Bus Schaltungen für professionelle Anwendungen" ("Data Book of I²C Bus Circuits for Professional Use"), by the "Valvo Components Sector of Philips GmbH", Dr. Alfred Hithig Verlag GmbH, Heidelberg, 1989.

In addition to the control program for data exposure, the magnification factors of the individual objectives which are screwed into the revolving nosepiece (2) are stored in the computer (16). These magnification data are loaded by the user when the microscope is taken into operation for the first time. The computer program then refers to the associated objective data corresponding to the signal supplied by the transducer (4), and calculates, with reference to the information supplied by the path measuring system (21a) concerning the zoom factor, the overall magnification on the photographic format. This scale factor of magnification, the objective magnification, the picture number, and also the date and time, are then passed by the computer (16) via the printer output (17) to the data back. The liquid crystal display is formed in its dimensions such that the distance between two matrix fields corresponds exactly to a distance in μm, multiplied by the scale factor, in the original image. It is then immediately possible to determine with a ruler the original size of the object in the later microphotographic picture.

The exposure of the additional information takes place after the exposure of the microscopic image. Directly after the closing of the shutter (9), the data back (21a) receives a trigger pulse from the computer (16). The data which are to be generated by the liquid crystal display have then already been loaded into the computer. In the subsequent short time, of about 100–200 ms, remaining until film transport, the light emitting diode (14) is switched on and the additional information is additionally exposed onto the photograph by means of the liquid crystal display (11).

The data back contains a flip-flop to store the trigger signal, so that the computer (16) can operate without critical timing. The trigger signal supplied by the shutter (9) is read by both the flip-flop of the data back and also the computer (16). It is thereby ensured that the exposure of the additional data always takes place, independently of whether the exposure is set in operation at the camera (21) or at the computer (16). After the exposure of the additional data, the flip-flop in the data back is immediately reset to be ready to be set in operation again by the trigger contact.

Figure 3:
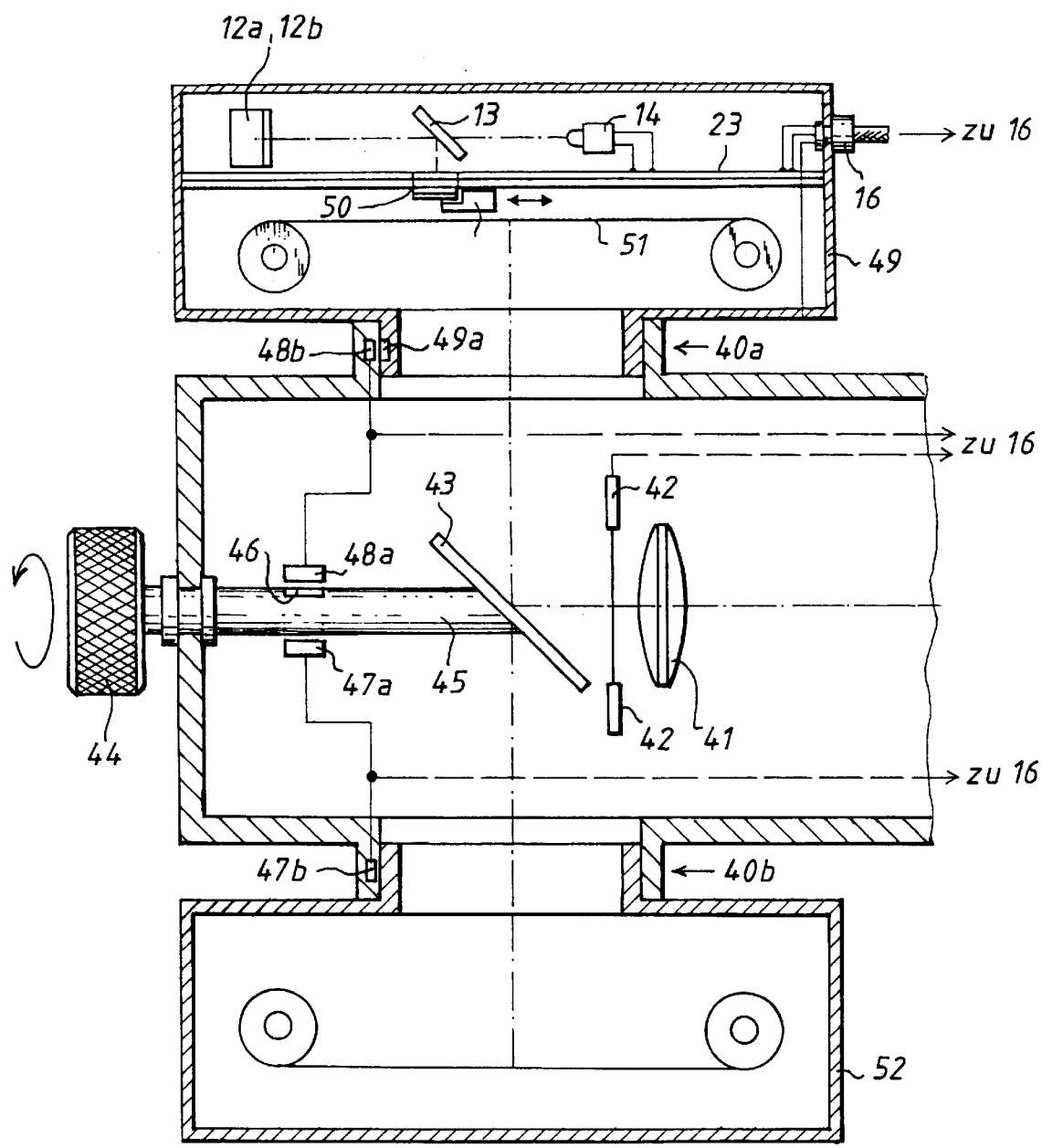
FIG. 3 is a section, in a plane containing the optical axis of the microscope, through a phototube with two photo outlets.

In the embodiment according to FIG. 3, the photo tube (40) has two photo outlets (40a, 40b). The photo outlets (40a, 40b) can be alternatively selected by means of the mirror (43), which can be rotated by means of a knob (44). In this embodiment, the shutter (42) is arranged between the camera objective and the rotatable mirror (43), so that only the photo-cassettes, without a shutter, need to be connected to the photo outlets. In the case shown in FIG. 3, only one of the photo cassettes, namely the photo cassette (49), has a data back with a liquid crystal display (50) for the exposure of additional data. To automatically determine whether a desired data exposure is possible, the photo tube (40) has, in the region of the photo outlets (40a, 40b), a respective electrical contact (47b, 48b) which is connected to a corresponding contact (49a) of the photo cassette (49). The electrical contacts (47b, 48b) are simultaneously connected to corresponding contacts (47a, 48a) which, through a further contact (46) on the rotary shaft of the rotatable mirror (43), obtain information concerning the light path which is at present set in the photo tube (40). Depending on whether the conduction path is open or closed, a different signal is emitted to the computer (16), as is indicated by the dashed lines. In the case shown in FIG. 3, the conductive loop is closed via the contacts (48a, 48b) and (49a), and the computer program thereby recognizes that an exposure of additional data is possible. If on the other hand the rotatable mirror (43) is rotated by 180°, so that the other film cassette (52) is exposed, no closed conductive loop is present and the computer (16) produces on the monitor a display to the effect that the desired data exposure is not possible.

What is claimed is:

1. A device comprising:
   an exposure apparatus capable of generating alphanumeric characters that are to be exposed onto a film plane of a camera, and
   a programmable computer having a standard serial or parallel computer interface and arranged such that said exposure apparatus is directly controlled via said standard serial or parallel computer interface of said programmable computer, wherein said camera has a region for attachment to said photomicroscope and a first coding device in said region for attachment for indicating a presence of said exposure apparatus, and said photomicroscope has a photographic outlet having a second coding device communicating with said first coding device for indicating a presence of said exposure apparatus.

2. A device comprising:
   exposure apparatus for exposure of additional information onto a film plane of a camera,
   a computer having a standard interface and arranged for controlling said exposure apparatus via said standard interface, and
   a camera having a film plane onto which said additional information is exposed,
   wherein said standard interface comprises a parallel printer interface of said computer.

3. Device according to claim 2, wherein said camera has a camera data back in which said exposure apparatus is arranged.

4. Device according to claim 2, wherein said camera has a camera data back in which said exposure apparatus is arranged, said camera data back includes a light emitting diode, a liquid crystal display first mirror and a second mirror arranged one behind the other between said light emitting diode and said liquid crystal display without interposition of refracting optics, and a surface normal of said second mirror is inclined to a plane that is spanned by a surface normal of said first mirror and said light emitting diode.

5. Device according to claim 2, wherein said camera has a camera data back in which said exposure apparatus is arranged, and said camera data back includes a light emitting diode, a liquid crystal display and a screen insertable between said liquid crystal display and said camera film plane, and said liquid crystal display has at least two columns, one column of which is arranged to be covered by said screen.

6. Device according to claim 2, wherein said camera has a camera data back in which said exposure apparatus is arranged, in combination with a photomicroscope, wherein said photomicroscope comprises an information outputting device for outputting information concerning microscope settings, and said information outputting device is arranged for control by said computer via said standard interface.

7. Device according to claim 6, wherein said photomicroscope includes a revolving nosepiece, and said information outputting device comprises a code transducer of said revolving nosepiece.

8. Device according to claim 2, wherein said photomicroscope includes a zoom system having a path measuring system, and said information outputting device comprises a code transducer of said path measuring system.

9. Device according to claim 2, wherein said camera has a region for attachment to said photomicroscope and a first coding device in said region for attachment for indicating a presence of said exposure apparatus, and said photomicroscope has a photographic outlet having a second coding device communicating with said first coding device for indicating a presence of said exposure apparatus.

10. Device according to claim 2, wherein said camera has a region for attachment to said photomicroscope, and coding means in said region of attachment for indicating a presence of said exposure apparatus, and said photomicroscope has a photographic outlet having code reader means for reading said coding means.

11. Device according to claim 2, wherein said computer is programmed for control of data exposure, for control of a camera shutter and for calculating of overall magnification.

12. A device comprising:

exposure apparatus for exposure of additional information onto a film plane of a camera, a computer having a standard interface and arranged for controlling said exposure apparatus via said standard interface, a camera having a film plane onto which said additional information is exposed, and a camera data back in which said exposure apparatus is arranged, wherein said camera data back includes a liquid crystal display and a screen insertable between said liquid crystal display and said camera film plane, and said liquid crystal display has at least two columns, one column of which is arranged to be covered by said screen.

13. Device according to claim 12, wherein said camera data back includes a light emitting diode and a liquid crystal display illuminated by said light emitting diode.

14. Device according to claim 12, wherein said camera data back further includes a first mirror and a second mirror arranged one behind the other between said light emitting diode and said liquid crystal display without interposition of refracting optics, and a surface normal of said second mirror is inclined to a plane that is spanned by a surface normal of said first mirror and said light emitting diode.

15. Device according to claim 14, wherein said camera data back further includes a screen insertable between said liquid crystal display and said camera film plane, and said liquid crystal display has at least two columns, one column of which is arranged to be covered by said screen.

16. Device according to claim 12, wherein said camera data back further includes a screen insertable between said liquid crystal display and said camera film plane, and said liquid crystal display has at least two columns, one column of which is arranged to be covered by said screen.

17. A device comprising:

exposure apparatus for exposure of additional information onto a film plane of a camera, a computer having a standard interface and arranged for controlling said exposure apparatus via said standard interface, and a camera having a film plane onto which said additional information is exposed, in combination with a photomicroscope, wherein said photomicroscope comprises an information outputting device for outputting information concerning microscope settings, said information outputting device is arranged for control by said computer via said standard interface, said photomicroscope further includes a revolving nosepiece, and said information outputting device comprises a code transducer of said revolving nosepiece.

18. Device according to claim 17, wherein said computer means is programmed for control of data exposure, for control of a camera shutter and for calculation of overall magnification.

19. A device comprising:

exposure apparatus for exposure of additional information onto a film plane of a camera, a computer having a standard interface and arranged for controlling said exposure apparatus via said standard interface, and a camera having a film plane onto which said additional information is exposed, in combination with a photomicroscope, wherein said photomicroscope comprises an information outputting device for outputting information concerning microscope settings, said information outputting device is arranged for control by said computer via said standard interface, said camera has a region for attachment to said photomicroscope, a first coding device in said region for attachment for indicating presence of said exposure apparatus, and said photomicroscope has a photographic outlet having a second coding device for communicating with said first coding device for indicating presence of said exposure apparatus.

20. Device according to claim 19, wherein said computer is programed for control of data exposure, for control of a camera shutter and for calculation of overall magnification.

21. A device comprising:

exposure apparatus for exposure of additional information onto a film plane of a camera, a computer having a standard interface and arranged for controlling said exposure apparatus via said standard interface, and a camera having a film plane onto which said additional information is exposed, in combination with a photomicroscope, wherein said photomicroscope comprises an information outputting device for outputting information concerning microscope settings, said information outputting device is arranged for control by said computer via said standard interface, said camera has a region for attachement to said photomicroscope and a coding device in said region for attachment to indicate a presence of said exposure apparatus, and said photomicroscope has a photographic outlet having a code reader for reading said coding device.

22. Device according to claim 21, wherein said computer is programmed for control of data exposure, for control of a camera shutter and for calculation of overall magnification.

* * * * *